Patented Jan. 4, 1938

2,104,370

UNITED STATES PATENT OFFICE 2,104,370

METHOD AND MEANS FOR SOLDERING, WELDING AND COATING METALS

Erik Harry Eugen Johansson, Stockholm, Sweden

No Drawing. Application November 15, 1933, Serial No. 698,073. In Sweden October 5, 1932

1 Claim. (Cl. 148—26)

It will be understood that where I use the word "metallizing" I refer to soldering, welding, coating, or plating.

In soldering the solder has hitherto generally been supplied to the soldering seam in a metallic state and caused to melt there. As a rule the solder consists of another metal and alloy respectively than the surfaces, which are to be joined by soldering. In general, analogous conditions are at hand at welding. Also in plating metal articles the coating metal is supplied as a metallic melt either by squirting or by steeping the objects in a metal melt. All of these procedures have in common that the soldering, welding or coating metal is supplied in a metallic state.

In the new process the soldering, welding or coating metal is not supplied in a metallic state but as chemical compounds, salts or oxides, the metal not being separated out of the said chemical compounds until it comes into contact with the metal to be soldered, welded or coated. The said chemical compounds react with the base metal so that the metallic constituents will be liberated in a molten state, which may be effected by supplying heat or wholly or partly by heat of reaction liberated at the transformation. A fresh surface of the base metal is obtained by the transformation, an easy and complete joining with the melt of soldering, welding or coating metals formed by the transformation taking place at the said surface. The chemical compound, from which metal is to be liberated is supplied mixed with one or more other substances. In such a case various flux salts may be used, the purpose of the said flux salts being to lower the melting point of the salt melt or to dissolve metal oxides from the surfaces which are to be soldered, welded or coated or to dissolve oxides or salts formed at the transformation.

According to this invention the mixture always contains a combination of a metal of the alkaline earths; thereby the mixture will become more easily fusible but at the same time more non-volatile, which is of importance for keeping a layer of the mixture in question at the metal surface.

The said chemical compounds may also be mixed with metals in a finely divided form or with embedded metal in thin layers or flakes. Thereby a more intense transformation or a transformation on the whole may be obtained in such cases, in which the said chemical compounds no not react with the base metal as a base metal.

By the new process the adherence between the base metal and the soldering, welding or coating metal becomes particularly effective and, in the case of soldering and welding, the quantity of the binding metal may be kept very small, which has a favourable influence especially upon the imperviousness and resistance to corrosion of the soldered seam.

To explain the procedure two applications of the new method will be described below, viz. soldering of aluminum and tinning of iron.

In soldering aluminum it is preferred to proceed in such a manner that a flux consisting of $KCl+NaCl+CaCl_2+CaF_2$ mixed with cadmium chloride is applied on the places, which are to be soldered, and the said places are pressed against each other during heating. After the flux has melted, the cadmium chloride reacts with aluminum and the formed molten metallic cadmium causes soldering. The aluminum chloride formed at the transformation reacts in its turn with the flux. Instead of cadmium chloride other metallic chlorides and oxides respectively or mixtures of such chlorides and oxides may be used, which react with aluminum. Haloids or other salts of cadmium and zinc may effectively be supplied in such a proportion that the metal melt obtained contains cadmium and zinc in the approximate ratio by weight of 1 to 3.

In tinning iron the surface, which has been carefully cleaned in the usual manner, is treated with a melt of tin salt with addition of a salt of calcium, preferably calcium fluoride, possibly along with other flux salts, a transformation taking place between iron and the tin salt and a very good tinning being obtained. The treatment may take place by squirting salt melts on to the heated object of iron or by steeping the object of iron in the salt melt. Haloids or other salts of cadmium and tin may effectively be supplied in such a proportion that the metal melt obtained contains cadmium and tin in the proportion by weight of 10 to 30% cadmium and 70 to 80% tin.

Of course the application of the new method is not restricted to the above mentioned examples, but may be used in all such cases, where a chemical transformation may take place between a base metal and a chemical compound of binding and coating metal respectively.

Having now described my invention, what I claim as new and desire to secure by Letters Patent is:

A method of metallizing objects of aluminum or its alloys in which cadmium and zinc are liberated in melted condition during the working process as metallizing metals from a mixture supplied to the surface of the object, said mixture containing haloid salts of cadmium and zinc and a fluoride of an alkaline earth metal, said salts of cadmium and zinc being in such a proportion by weight that the metal melt obtained by reaction contains cadmium and zinc in the approximate ratio 1:3.

ERIK HARRY EUGEN JOHANSSON.